(12) United States Patent  
Stigler et al.

(10) Patent No.: US 10,131,265 B2  
(45) Date of Patent: Nov. 20, 2018

(54) TRAILER FOR AUTONOMOUS VEHICLE

(71) Applicant: Silicis Technologies, Inc., Westfield, IN (US)

(72) Inventors: Michael J. Stigler, Westfield, IN (US); Nicholas James Setar, Westfield, IN (US)

(73) Assignee: Silicis Technologies, Inc., Westfield, IN (US)

( * ) Notice: Subject to any disclaimer, the term of this patent is extended or adjusted under 35 U.S.C. 154(b) by 0 days.

(21) Appl. No.: 14/912,474

(22) PCT Filed: Sep. 11, 2014

(86) PCT No.: PCT/US2014/055075  
§ 371 (c)(1),  
(2) Date: Feb. 17, 2016

(87) PCT Pub. No.: WO2015/038697  
PCT Pub. Date: Mar. 19, 2015

(65) Prior Publication Data  
US 2016/0200235 A1    Jul. 14, 2016

Related U.S. Application Data

(60) Provisional application No. 61/876,278, filed on Sep. 11, 2013.

(51) Int. Cl.  
*B64C 39/02* (2006.01)  
*B60P 7/06* (2006.01)  
(Continued)

(52) U.S. Cl.  
CPC . *B60P 3/11* (2013.01); *B60P 7/06* (2013.01); *B60P 7/0876* (2013.01); *B64B 1/10* (2013.01);  
(Continued)

(58) Field of Classification Search  
CPC ........ B64B 1/10; B64C 2201/06; B64F 3/02; G08C 17/02  
(Continued)

(56) References Cited

U.S. PATENT DOCUMENTS 5,695,153 A     12/1997  Britton et al.  
9,352,832 B2 *  5/2016   Vander Lind ........... B64C 31/06  
(Continued)

FOREIGN PATENT DOCUMENTS

WO     2007141795 A1    12/2007

OTHER PUBLICATIONS

PCT/US2014/055075, International Bureau of WIPO, PCT International Preliminary Report on Patentability, dated Mar. 15, 2016.

*Primary Examiner* — Tyler J Lee  
(74) *Attorney, Agent, or Firm* — Ice Miller LLP

(57) ABSTRACT

The disclosed embodiments include a trailer for an autonomous vehicle controlled by a command and control interface. The trailer includes a trailer body configured to retain the autonomous vehicle in an undeployed configuration. The trailer also anchors the autonomous vehicle in a deployed configuration. A tether is provided having a first end coupled to the trailer body and a second end that is configured to couple to the autonomous vehicle. A winch is utilized to adjust a length of the tether to move the autonomous vehicle between the undeployed configuration and deployed configuration. Further, a communication system communicates with the command and control interface and the autonomous vehicle to control movement of the autonomous vehicle between the undeployed configuration and deployed configuration.

22 Claims, 16 Drawing Sheets

(51) Int. Cl.
*B60P 7/08* (2006.01)
*B60P 3/11* (2006.01)
*B64B 1/66* (2006.01)
*B64B 1/10* (2006.01)
*B64B 1/50* (2006.01)
*B64B 1/58* (2006.01)
*B64F 1/14* (2006.01)
*B64F 3/02* (2006.01)
*G08C 17/02* (2006.01)

(52) U.S. Cl.
CPC ............... *B64B 1/50* (2013.01); *B64B 1/58* (2013.01); *B64C 39/022* (2013.01); *B64C 39/024* (2013.01); *B64F 1/14* (2013.01); *B64F 3/02* (2013.01); *G08C 17/02* (2013.01); *B64B 1/66* (2013.01); *B64C 2201/022* (2013.01); *B64C 2201/06* (2013.01); *B64C 2201/101* (2013.01); *B64C 2201/12* (2013.01); *B64C 2201/121* (2013.01); *B64C 2201/125* (2013.01); *B64C 2201/127* (2013.01); *B64C 2201/148* (2013.01); *B64C 2201/208* (2013.01)

(58) Field of Classification Search
USPC ............................................................ 701/23
See application file for complete search history.

(56) References Cited

U.S. PATENT DOCUMENTS

| | | | |
|---|---|---|---|
| 9,399,506 B2 * | 7/2016 | Cunningham | B64F 1/12 |
| 2008/0068782 A1 | 3/2008 | Muchow et al. | |
| 2011/0147513 A1 * | 6/2011 | Surmont | B64B 1/10 |
| | | | 244/33 |
| 2012/0104763 A1 * | 5/2012 | Lind | B64C 31/06 |
| | | | 290/55 |
| 2012/0112008 A1 * | 5/2012 | Holifield | B64C 27/02 |
| | | | 244/155 A |
| 2012/0181380 A1 | 7/2012 | Van Staagen et al. | |
| 2012/0210853 A1 | 8/2012 | Abershitz et al. | |
| 2012/0303179 A1 * | 11/2012 | Schempf | B25J 11/002 |
| | | | 701/2 |
| 2013/0035901 A1 | 2/2013 | Breed | |
| 2014/0312647 A1 * | 10/2014 | Wang | B60J 11/04 |
| | | | 296/136.02 |

* cited by examiner

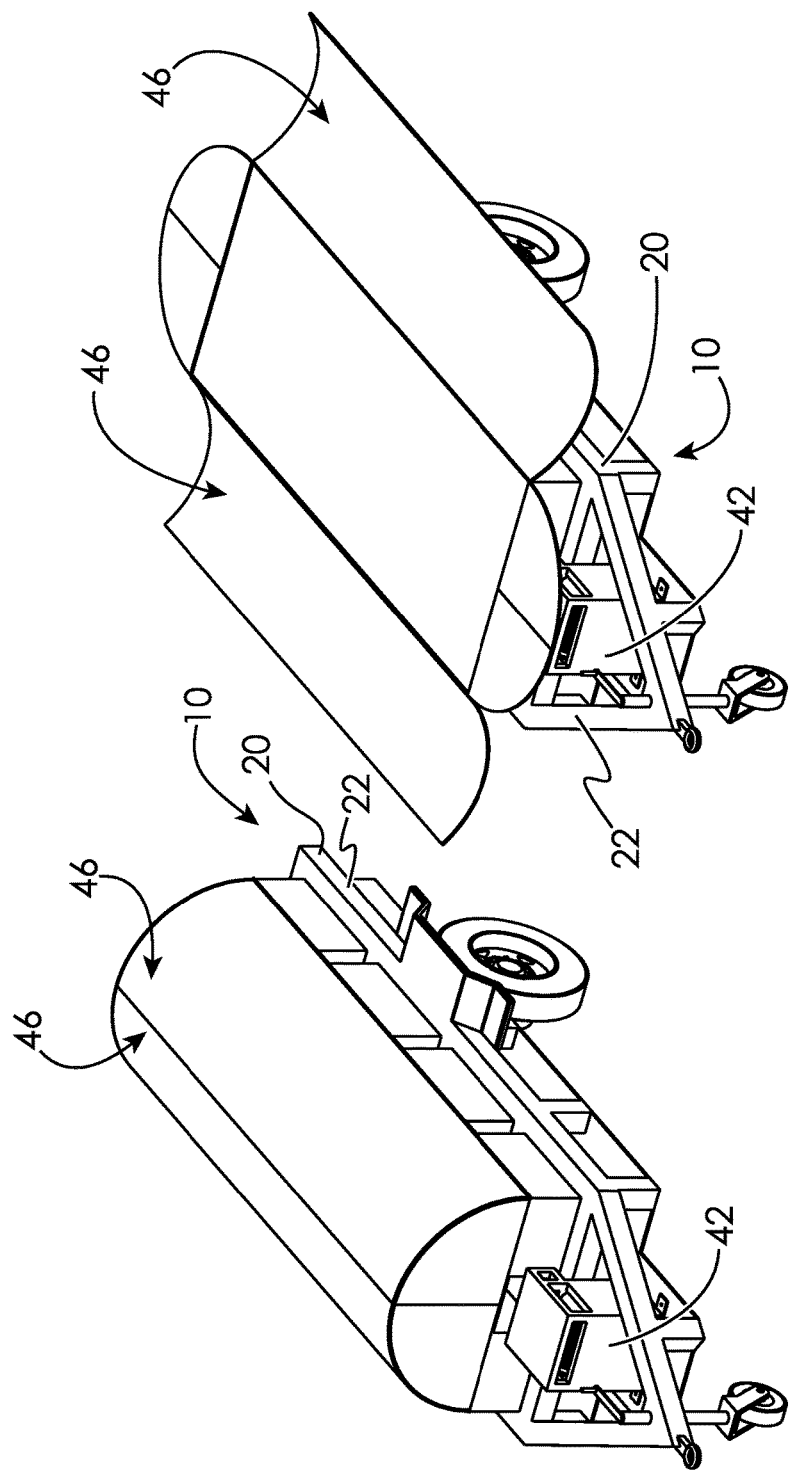

TRAILER FOR AUTONOMOUS VEHICLE

PRIORITY

The present application is related to, claims the priority benefit of, and is a United States 35 U.S.C. § 371 national stage entry of International Patent Application Serial No. PCT/US2014/055075, filed Sep. 11, 2014, which is related to and claims the priority benefit of U.S. Provisional Patent Application Ser. No. 61/876,278, filed on Sep. 11, 2013. The contents of each of these applications are hereby incorporated by reference in their entirety into this disclosure.

TECHNICAL FIELD OF THE DISCLOSED EMBODIMENTS

The present disclosure generally relates to autonomous or semi-autonomous aircraft and other vehicles and a system and method for controlling aircraft and other vehicles.

BACKGROUND OF THE DISCLOSED EMBODIMENTS

Since the early days of intelligence satellites, aerial surveillance and reconnaissance has been a paramount feature of the intelligence community. Satellite reconnaissance, however, suffers from many drawbacks. For example, satellites are very costly to manufacture, deploy and operate. In addition, in order to monitor a particular area on the ground, the position of a geosynchronous orbit satellite may need to be changed. The process of changing the position of a satellite is costly and cumbersome. Furthermore, some satellites are not configured to provide continuous high resolution video monitoring of an area. In some cases, the satellites are configured to only provide high resolution still images.

Other aerial reconnaissance vehicles include manned or unmanned aerial vehicles, such as intelligence aircraft, e.g., unmanned drones. However, these aerial vehicles also suffer from drawbacks. For example, the length of time an aerial vehicle can remain above a particular area is limited to amount of fuel and/or battery charge onboard the vehicle. In addition, operational costs of these vehicles can also be high and prohibitive of widespread use. In fact, the cost of operation alone is a limiting factor for widespread use of these vehicles in modern reconnaissance operations.

Therefore, a low cost intelligence, surveillance and reconnaissance system including one or several aerial vehicles is needed to provide useful intelligence in widespread reconnaissance operations.

SUMMARY OF THE DISCLOSED EMBODIMENTS

The disclosed embodiments include a trailer for an autonomous vehicle controlled by a command and control interface. The trailer includes a trailer body configured to retain the autonomous vehicle in an undeployed configuration. The trailer also anchors the autonomous vehicle in a deployed configuration. A tether is provided having a first end coupled to the trailer body and a second end that is configured to couple to the autonomous vehicle. A winch is utilized to adjust a length of the tether to move the autonomous vehicle between the undeployed configuration and deployed configuration. Further, a communication system communicates with the command and control interface and the autonomous vehicle to control movement of the autonomous vehicle between the undeployed configuration and deployed configuration.

In one embodiment, the command and control interface is positioned remotely from the trailer body and the communication system communicates with the command and control interface and the autonomous vehicle over wireless radio frequencies. The communication system communicates with the command and control interface and the autonomous vehicle to control an operation of the winch.

In one embodiment, the trailer includes sensors positioned on the trailer body to monitor environmental data. At least one of the sensors and the autonomous vehicle monitor environmental data and the winch is controlled based on the environmental data. The communication system may transmit a signal to the command and control interface indicating that the autonomous vehicle is required to be removed from the deployed position based on the environmental data. The winch may automatically remove the autonomous vehicle from the deployed position based on the signal. Optionally, an operator of at least one of the command and control interface or the trailer can override the signal to maintain the deployed position of the autonomous vehicle. The environmental data may include at least one of mean power consumption of the autonomous vehicle for 30 seconds, one minute, 10 minutes, or an entire mission, remaining autonomous vehicle battery charge, wind speed, wind direction, or ambient temperature.

In one embodiment, the trailer includes a power distribution system to convert raw energy into clean energy. The trailer is powered by the power distribution system. The trailer may also include power outlets electrically coupled to the power distribution system and configured to receive auxiliary devices.

In one embodiment, the trailer includes a gas containment system to provide lighter than air gas to the autonomous vehicle. The gas containment system may convert water into hydrogen.

In one embodiment, the trailer includes a cradle coupled to the trailer body. The cradle may be configured to moor the autonomous vehicle in the undeployed configuration. The cradle may moor the autonomous vehicle in one of a deflated configuration or an inflated configuration. The cradle may rotate with respect to the trailer body.

In one embodiment, the trailer includes a fairlead to guide the tether. The fairlead may be removable from and positioned remotely from the trailer body to deploy the autonomous vehicle.

In one embodiment, the trailer includes a mast extending upward from the trailer body. The mast may be configured to receive a payload from the autonomous vehicle. The mast may be telescoping to extend upward from the trailer body.

In one embodiment, the trailer includes integrated ground radar and sensors, for example, automated machines gun sensors, gunshot detection sensors, camera sensors, and ICOM chatter listening devices. The trailer may include weather station sensors to monitor at least one of wind speed, wind direction, atmospheric pressure, and atmospheric temperature.

In one embodiment, the trailer body is expandable to extend a footprint of the trailer. The trailer body may include telescoping extensions to extend the trailer footprint. The trailer body may include a detachable portion that is positionable at a distance from the trailer body to extend the trailer footprint. The trailer body may fold outward to extend the trailer footprint. The trailer body may include tarps and/or a mesh trampoline that extends outward from the trailer body to extend a footprint of the trailer.

In one embodiment, the trailer body includes a cradle that rotates 360 degrees about an axis extending substantially perpendicular to a centerline of the trailer. The cradle may include at least one cradle extension that extends outward from the cradle. A wheel support may extend between the cradle extension and the ground. The wheel support has a wheel on an end thereof that is positioned on the ground.

In one embodiment, a cocoon extends from the trailer body around the autonomous vehicle. The cocoon may include a rigid structure that folds out from trailer body, a wind screen that extends along a front of the autonomous vehicle, and/or a roof to entirely encapsulate the autonomous vehicle.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 8A is a top perspective view of a trailer formed in accordance with an embodiment and in a closed position.

FIG. 8B is a top perspective view of the trailer shown in FIG. 8A and in an open position.

DETAILED DESCRIPTION OF THE DISCLOSED EMBODIMENTS

Figure 1A:
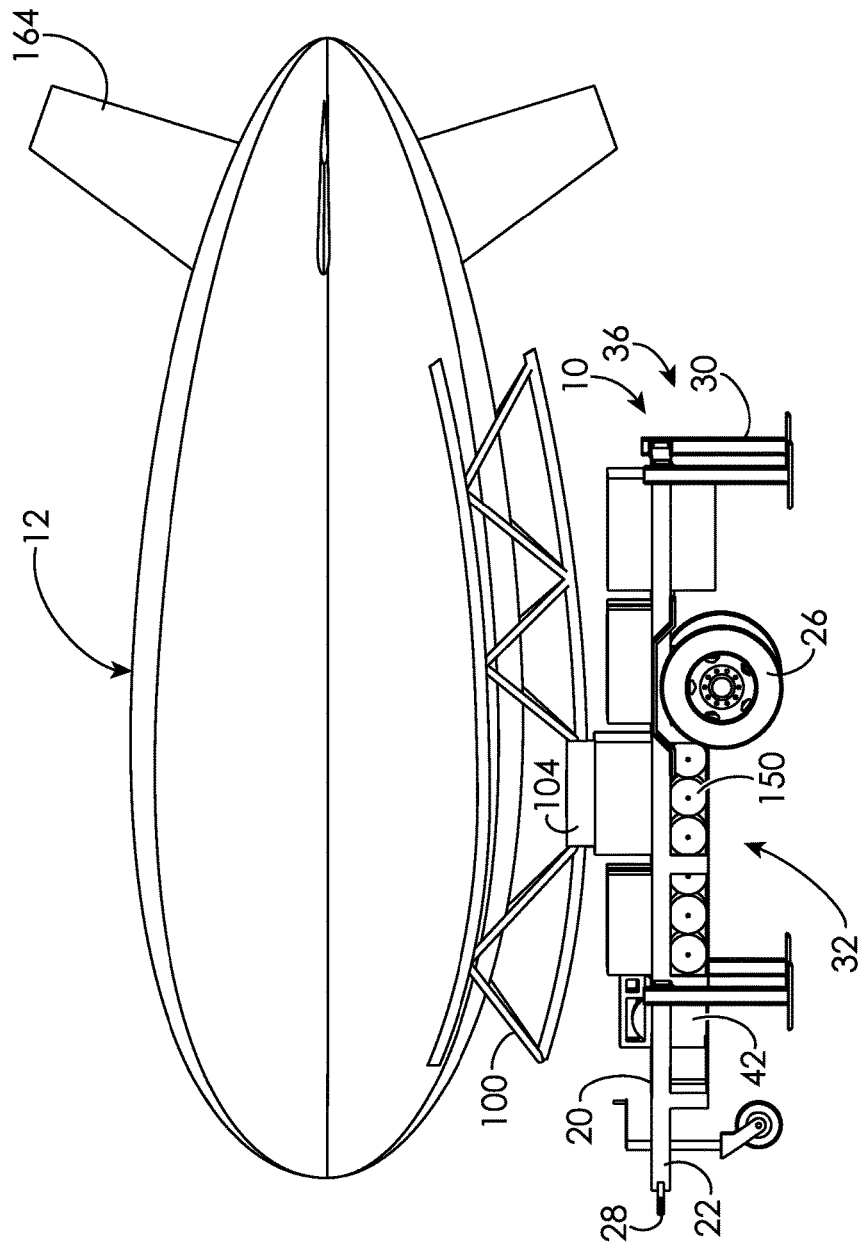
FIG. 1A is a side view of a trailer and autonomous vehicle formed in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The embodiments described herein provide a trailer 10 for an autonomous vehicle 12, such as the autonomous vehicles described in PCT/US2012/049790 filed on Aug. 6, 2012 and titled "AUTONOMOUS INTELLIGENCE SURVEILLANCE RECONNAISSANCE AND PAYLOAD DELIVERY SYSTEM AND METHOD OF USING THE SAME", which is herein incorporated by reference in its entirety.

A trailer 10 capable of operating the one or several aerial vehicles 12 is needed to automatically control the vehicles 12 while the trailer 10 is unmanned. The embodiments described allow deployment and undeployment of lighter than air autonomous vehicles 12 that are tethered for aerial reconnaissance using a winch or other device to extend or retreat the tether 14.

The trailer 10 of the present embodiment is configured to be positioned at a remote location, i.e. launch site, to launch the autonomous vehicle 12. The trailer 10 communicates with both the autonomous vehicle 12 and a command and control interface 16 to control the autonomous vehicle 12. After set up at the launch site, the trailer 10 may be left unmanned while the autonomous vehicle 12 is controlled remotely from the command and control interface 16. Alternatively, the trailer 10 may be manned and the autonomous vehicle 12 may be controlled at the trailer 10. In one embodiment, the trailer 10 may also link to a remote viewing station 18. The remote viewing station 18 may be capable of taking over control of the system. In one embodiment, the remote viewing station 18 may be positioned approximately 30 kilometers from the trailer 10.

The trailer 10, command and control interface 16, and the autonomous vehicle 12 may all be configured to monitor conditions for flight of the autonomous vehicle 12. Based on the monitored conditions, the trailer 10 and/or the command and control interface 16 may operate the deployment and undeployment of the autonomous vehicle 12. The autonomous vehicle 12 may be undeployed based on commands from the trailer 10 and/or the command and control interface 16 without the need for operator input. Alternatively, the autonomous vehicle 12 may undeploy itself if the vehicle 12 determines that it must come down. It should be noted that all of the functions of the trailer 10 described below may be performed automatically. For example, the trailer 10 may be driven to a launch site and parked; and the autonomous vehicle 12 may be deployed by initiating a single button. The autonomous vehicle 12 may then be monitored and controlled by the trailer 10 without user intervention. Optionally, the functions of the trailer 10 may be controlled manually by an operator.

Trailer Body

Figure 1B:
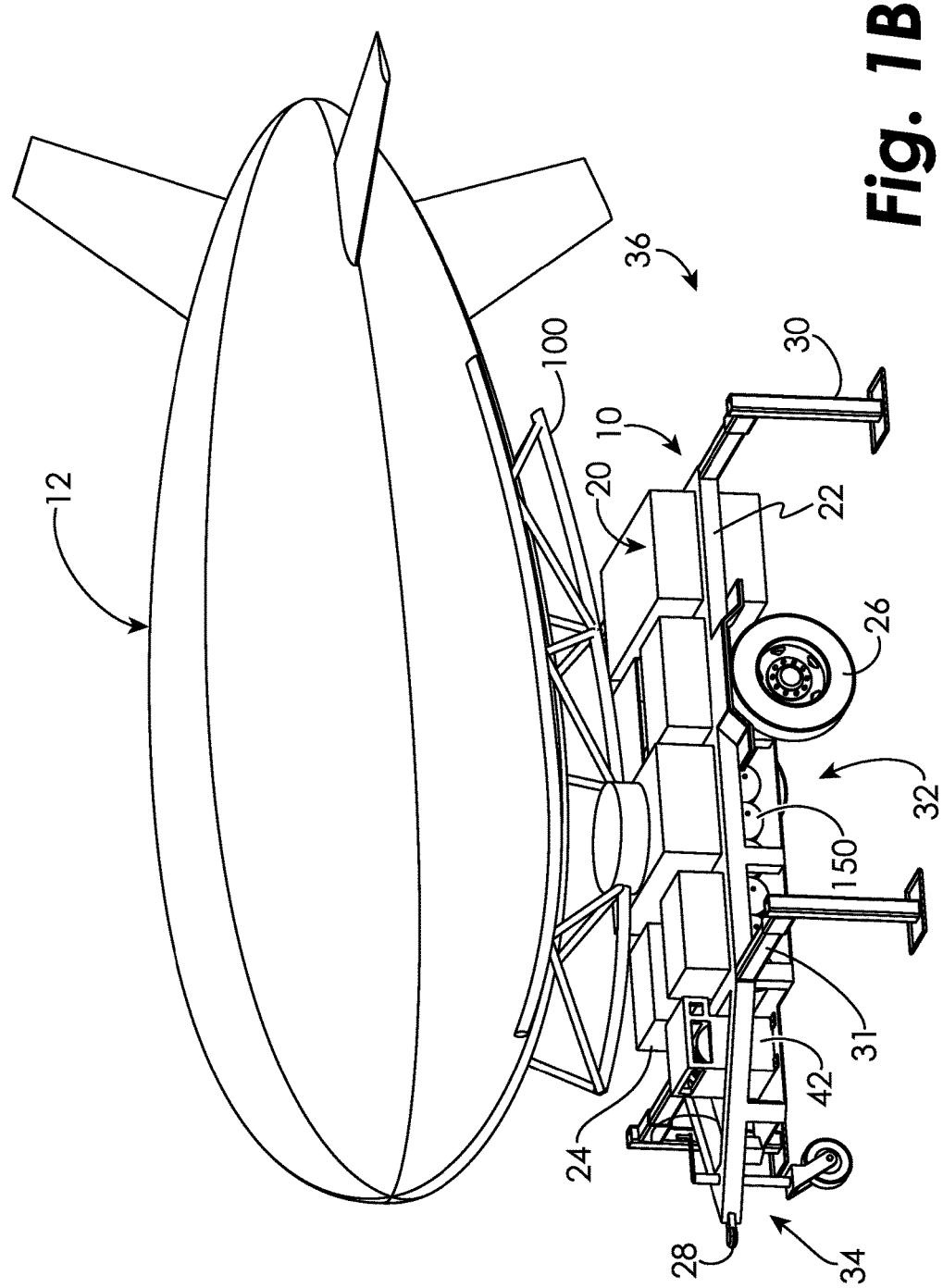
FIG. 1B is a side perspective view of a trailer and autonomous vehicle formed in accordance with an embodiment.

The trailer body 20 includes a frame 22 to support the autonomous vehicle 12 and a variety of control systems 24, as shown in FIGS. 1A and 1B. The trailer body 20 includes wheels 26 and a hitch 28 that allow the trailer body 20 to be towed behind any vehicle capable of towing a trailer. Optional adjustable legs 30, as shown in FIGS. 1A and 1B, on the trailer extend downward to secure the trailer body 20, for example when deploying the vehicle 12. The adjustable legs 30 inhibit the trailer body 20 from rolling while the autonomous vehicle 12 is deployed.

The autonomous vehicle 12 is supported and retained by the trailer body 20 in an undeployed configuration. For example, the autonomous vehicle 12 may be deflated and transported on the trailer body 20. Upon reaching a launch location for the autonomous vehicle 12, the vehicle 12 may be inflated on the trailer body 20 or removed from the trailer body 20 and inflated on the ground. When the autonomous vehicle's mission is completed, the vehicle 12 may be deflated for storage on the trailer body 20.

Alternatively, the autonomous vehicle 12 may be transported on the trailer body 20 in an inflated configuration. In such an embodiment, the autonomous vehicle 12 may be launched directly from the trailer body 20 or removed from the trailer body 20 for launching. Additionally, when the autonomous vehicle's mission is completed, the vehicle 12 may be stored on the trailer body 20 in the inflated configuration for quick removal of the trailer 10 and vehicle 12 from the launch site.

Figure 9A:
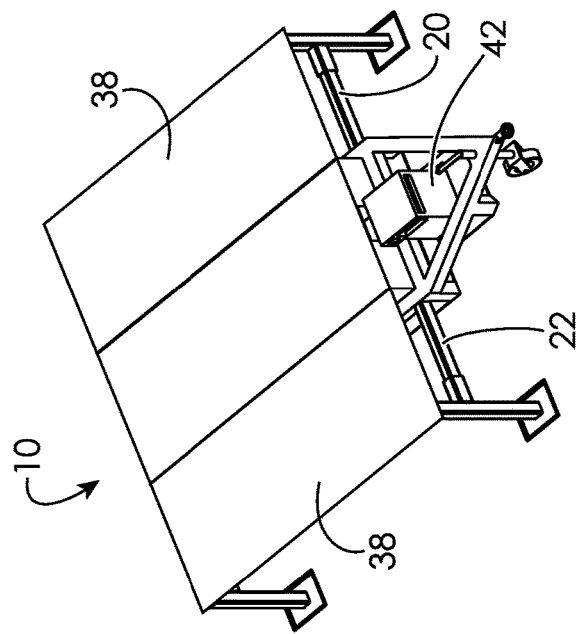
FIG. 9A is a top perspective view of a trailer formed in accordance with an embodiment and in a closed position.
Figure 9B:
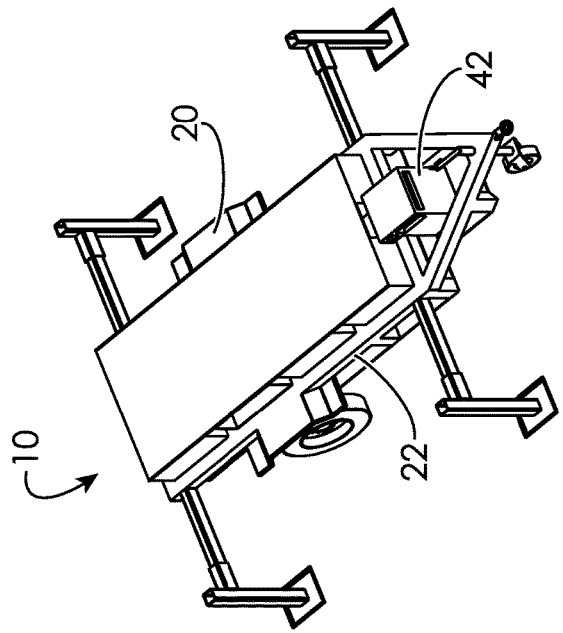
FIG. 9B is a top perspective view of the trailer shown in FIG. 9A and in an open position.

In an embodiment, the trailer body 20 may be expandable to extend a footprint of the trailer 10. The extended footprint is provided to maintain a position of the autonomous vehicle 12 off the ground. The trailer body 20 may include telescoping sections 31, as shown in FIG. 1B, that are moveable after removing a pin that retains the section during transport. The telescoping section 31 and/or sections 31 slide out from the trailer body 20 from at least one of the sides 32 of the trailer 10, the front 34 of the trailer 10, or the back 36 of the trailer 10. In another embodiment, as shown in FIGS. 9A and 9B, drawers 38 may be positioned within the trailer body 20. The drawers 38 may be slid out from the trailer body 20 to extend the footprint of the trailer 10. The fairlead 40 and/or the winch 42 may be attached to the extension/drawer 38.

Figure 7A:
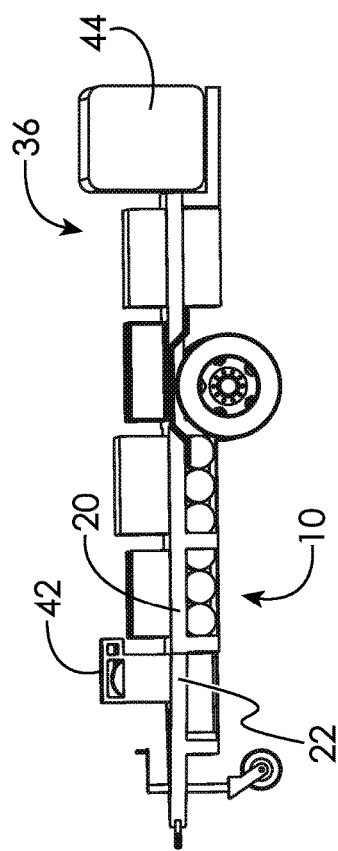
FIG. 7A is a side view of a trailer formed in accordance with an embodiment and in an undeployed position.
Figure 7B:
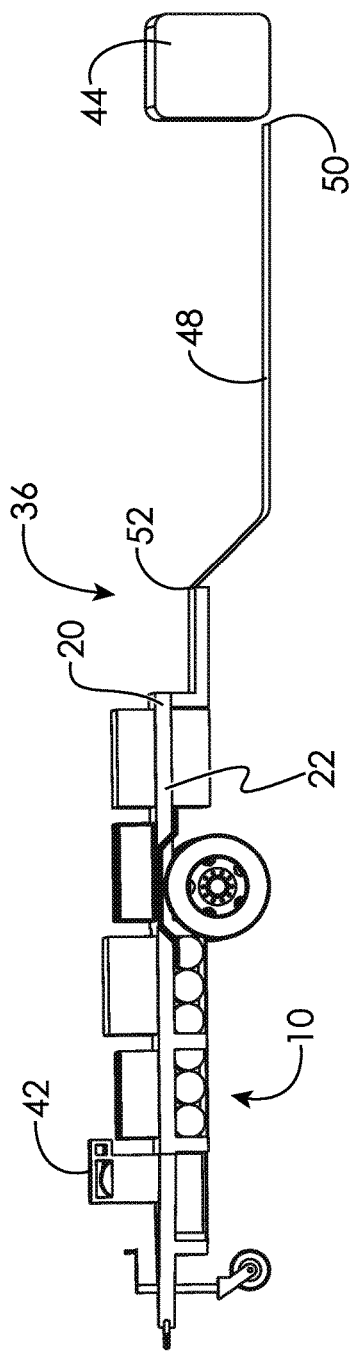
FIG. 7B is a side view of the trailer shown in FIG. 7A and in a deployed position.

In an embodiment, the trailer body 20 includes a detachable portion 44 that is removed from the back 36 of the trailer 10, as shown in FIGS. 7A and 7B. For example, the trailer 10 may be driven to a first location, where the detachable portion 44 is left. The trailer 10 may then be driven forward to a second location, where the remainder of the trailer 10 is positioned. The fairlead 40 and/or winch 42 may be attached to the detachable portion 44. Additionally, the autonomous vehicle 12 may be retained on the detachable portion 44. For example, the detachable portion 44 may include a cradle 100 that holds the autonomous vehicle 12.

In yet another embodiment, the top 46 of trailer 10 or portions of the top 46 of the trailer 10 may fold outward with respect to the trailer body 20, thereby expanding the trailer footprint, as shown in FIGS. 8A and 8B.

In should be noted, that any of the above described extensions 30, detachable portion 44, drawers 38, etc. may include feet to stabilize the extension 30, detachable portion 44, drawer 38, etc. off of the ground.

Additionally tarps and/or a mesh trampoline 48 may roll outward from any one of the sides 32, front 34, and/or back 36 of the trailer body 20, as shown in FIG. 7B. The tarps and/or a mesh trampoline 48 may roll out from the body and be positioned on the ground to protect the autonomous vehicle 12. Alternatively, the tarps and/or a mesh trampoline 48 may be joined to the extension 30, detachable portion 44, drawer 38, etc. For example, when the detachable portion 44 is left at a first position and the remainder of the trailer 10 is driven forward, the tarp and/or a mesh trampoline 48 may roll out from the trailer body 20 as the trailer 10 is being driven forward. This is accomplished by joining a first end 50 of the tarp and/or a mesh trampoline 48 to the detachable portion 44 and joining the second end 52 of the tarp and/or a mesh trampoline 48 to the remainder of the trailer 10. As will be appreciated by one of skill in the art, the tarps and/or a mesh trampoline 48 may also roll out with an extension 30 and/or drawer 38.

Figure 2A:
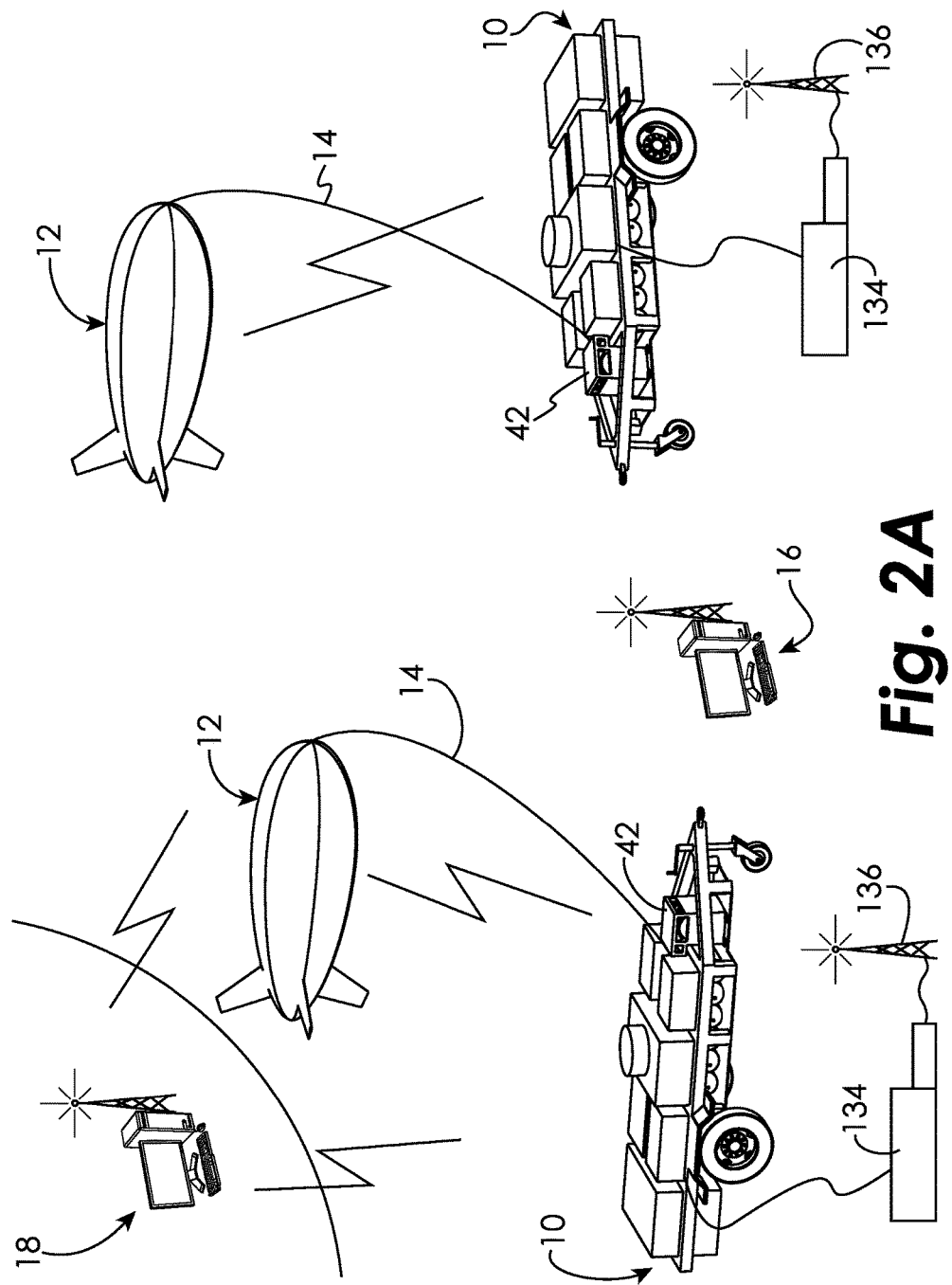
FIG. 2A is a schematic view of a reconnaissance system formed in accordance with an embodiment.
Figure 2B:
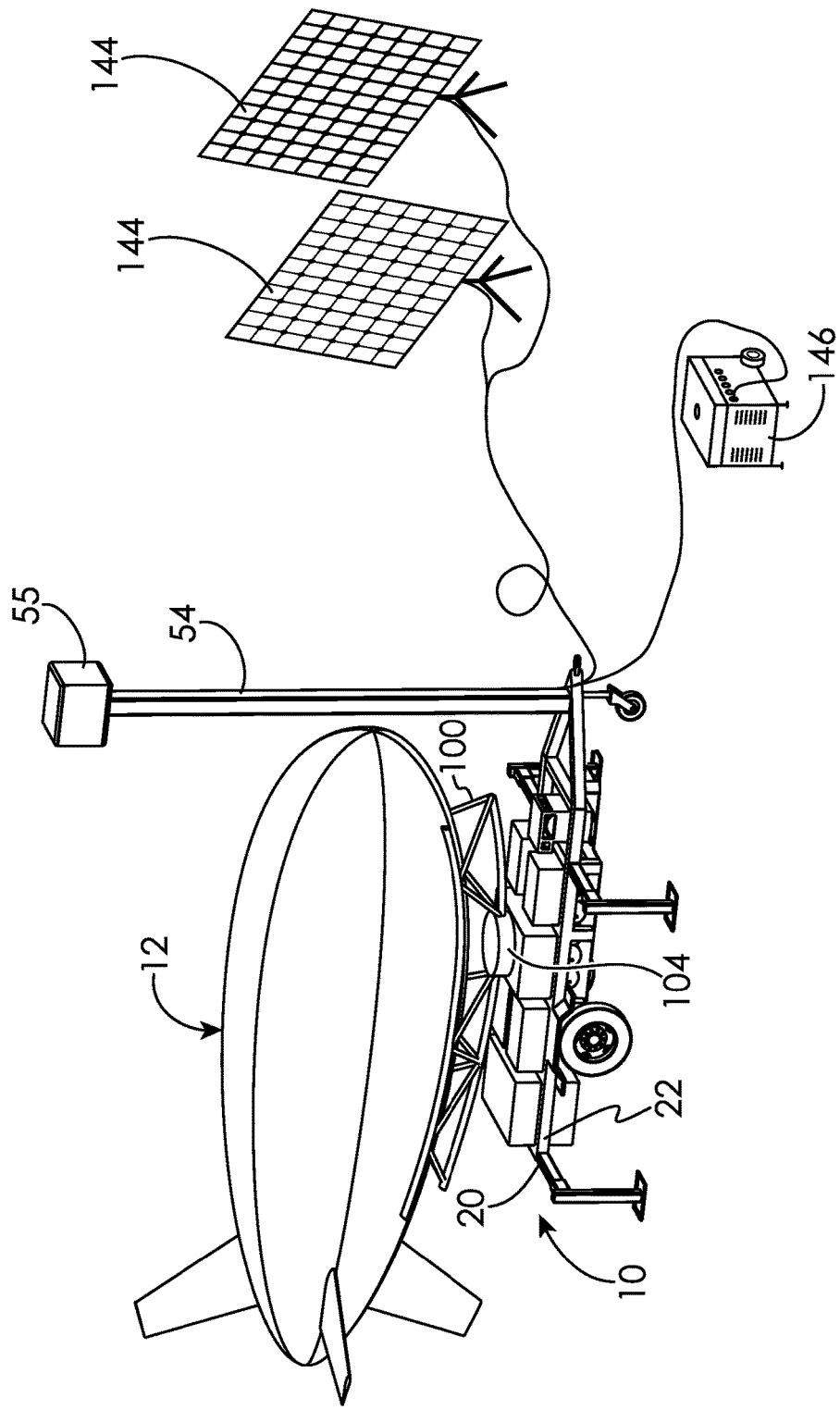
FIG. 2B is a schematic view of a reconnaissance system formed in accordance with an embodiment.
Figure 3A:
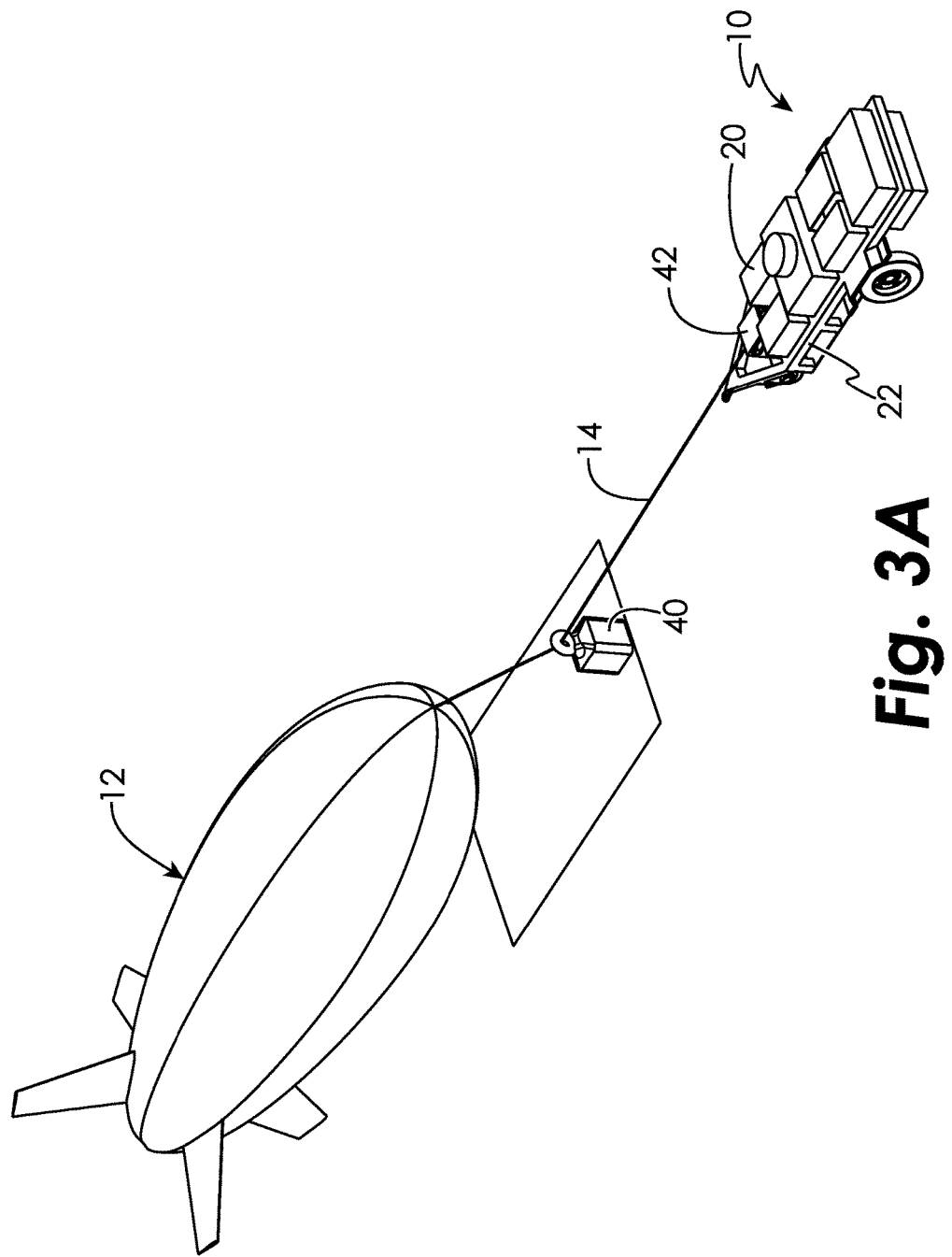
FIG. 3A is a top perspective view of a trailer and autonomous vehicle formed in accordance with an embodiment.
Figure 3B:
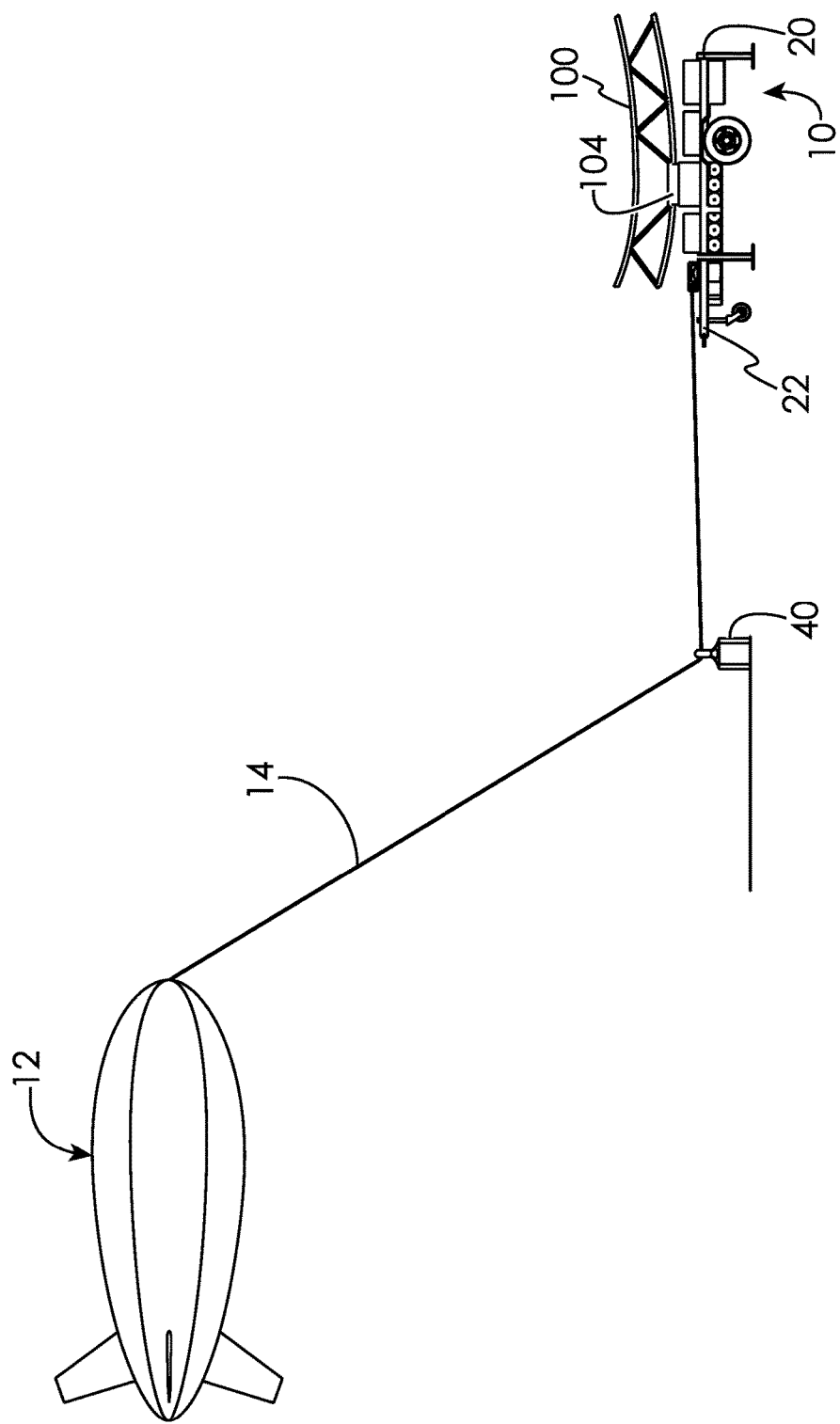
FIG. 3B is a side view of a trailer and autonomous vehicle formed in accordance with an embodiment.
Figure 3C:
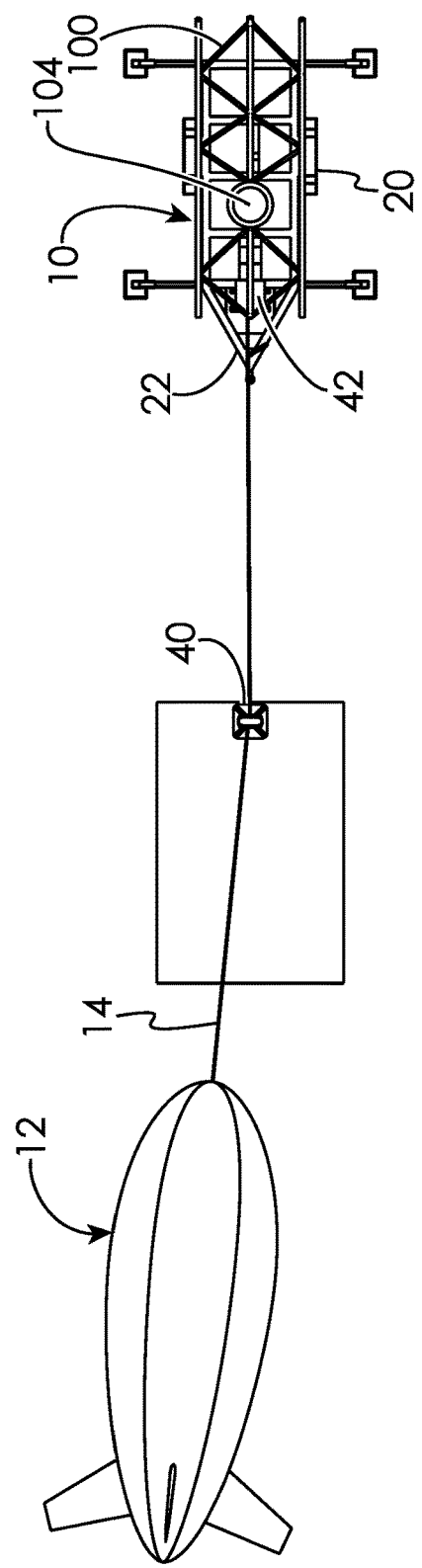
FIG. 3C is a top view of a trailer and autonomous vehicle formed in accordance with an embodiment.
Figure 4:
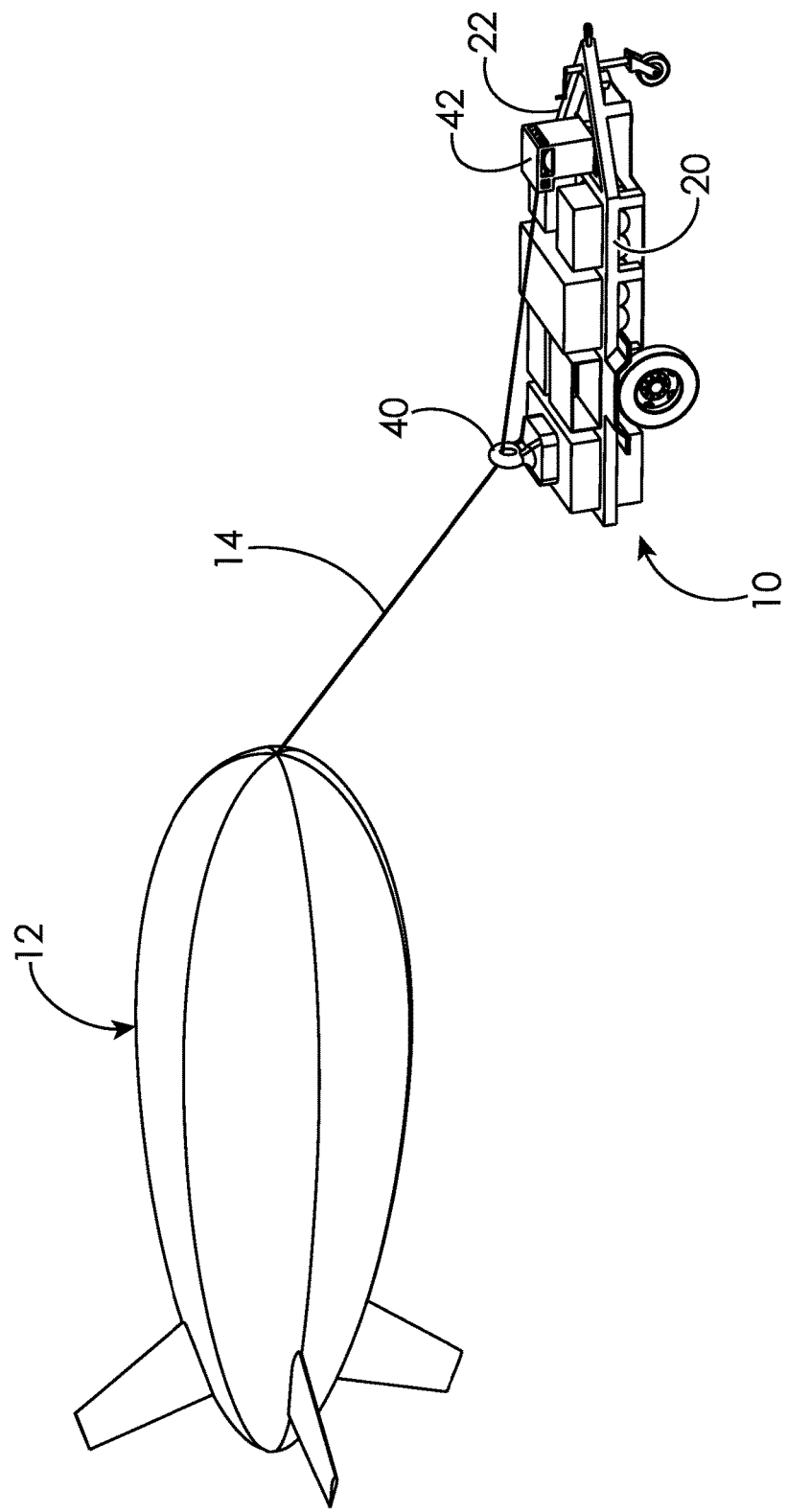
FIG. 4 is a side perspective view of a trailer and autonomous vehicle formed in accordance with an embodiment.
Figure 5A:
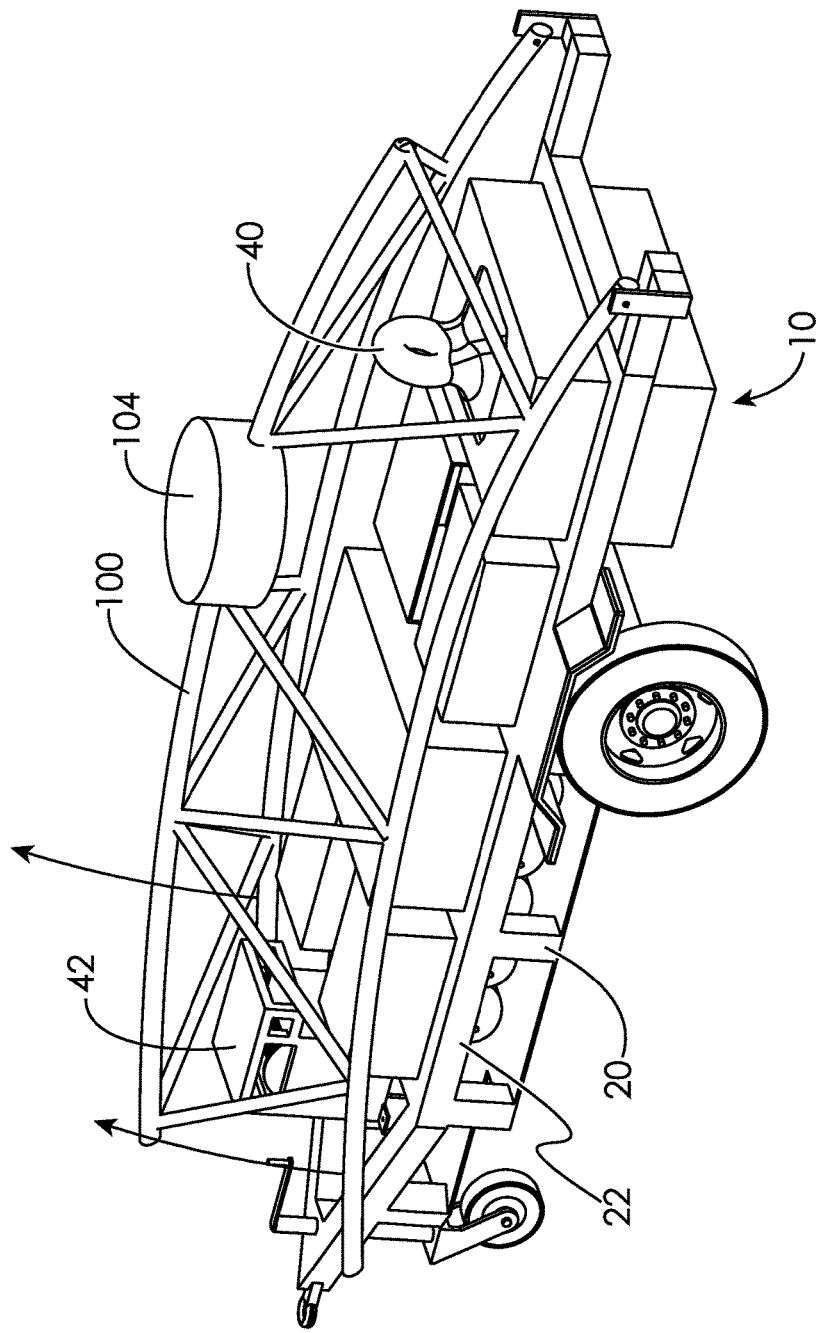
FIG. 5A is a side perspective view of a trailer formed in accordance with an embodiment and in a closed position.
Figure 5B:
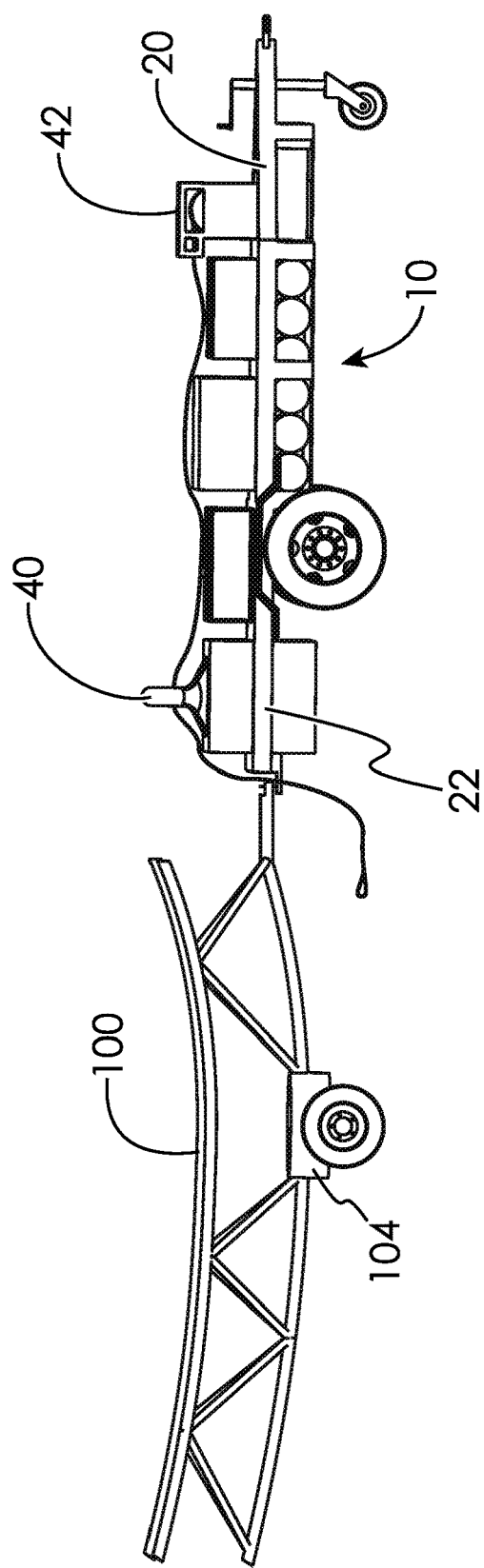
FIG. 5B is a side view of the trailer shown in FIG. 5A and in an open position.

In one embodiment, the trailer 10 includes a mast 54 extending upward from the trailer body 20, as shown in FIG. 2B. The mast 54 may be configured to receive a payload 55 from the autonomous vehicle 12. Accordingly, the payload of the autonomous vehicle 12 and the mast 54 is interchangeable. The mast 54 may be telescoping to extend upward from the trailer body 20. Additionally, the mast 54 may be used simultaneously with the autonomous vehicle 12.

Cradle

In an embodiment, the trailer body 20 may include a cradle 100 having a cradle body 102 to store the autonomous vehicle 12. The cradle 100 may extend from a rear 36 of the trailer body 20 or the cradle 100 may rotate outward from the trailer body 20 for deployment of the autonomous vehicle 12. The autonomous vehicle 12 may be stored on the cradle 100 in either the inflated or the deflated configuration. In such an embodiment, the autonomous vehicle 12 is capable of being launched directly from the cradle 100. Moreover, the autonomous vehicle 12 may undeploy and come to rest in the cradle 100 without user intervention. The autonomous vehicle 12 may rest in the cradle 100 for an extended period of time until an operator is available to moor the autonomous vehicle 12 to the cradle 100.

Figure 6:
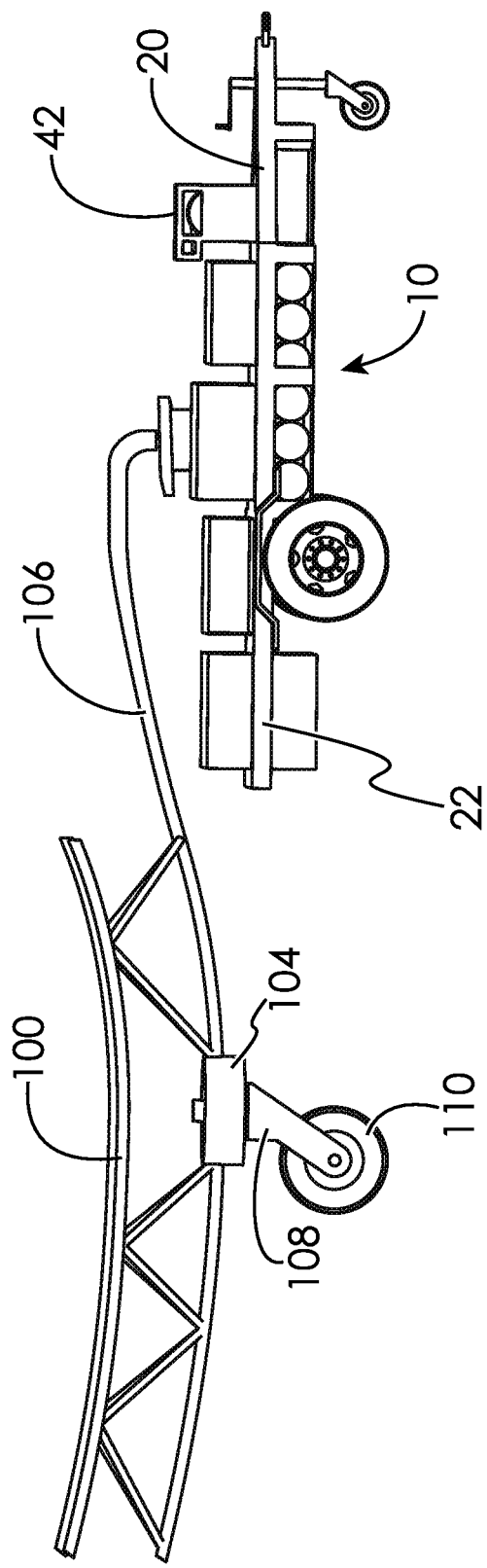
FIG. 6 is a side view of a trailer formed in accordance with an embodiment.

The cradle 100 may also be positioned on top of the trailer 10 and rotate up to 360 degrees about an axis 104 that is substantially perpendicular to the trailer body 20. The cradle 100 may have complete rotation about the axis 104 of more than 360 degrees. The cradle 100 rotates to position the autonomous vehicle 12 with respect to wind direction. The fairlead 40 may be positioned along the axis 104 of the cradle 100. In one embodiment, the fairlead 40 may be replaced by a roller bearing. The cradle 100 may also include an extendable portion 106 that extends outside the perimeter of the trailer body 20, as shown in FIG. 6. The extendable portion 106 may include a retractable post 108 with an optional shock absorber and a wheel 110 on the end that may be extended to the ground to allow the cradle 100 to roll 360 degrees around the trailer body 20.

Cocoon

Figure 10:
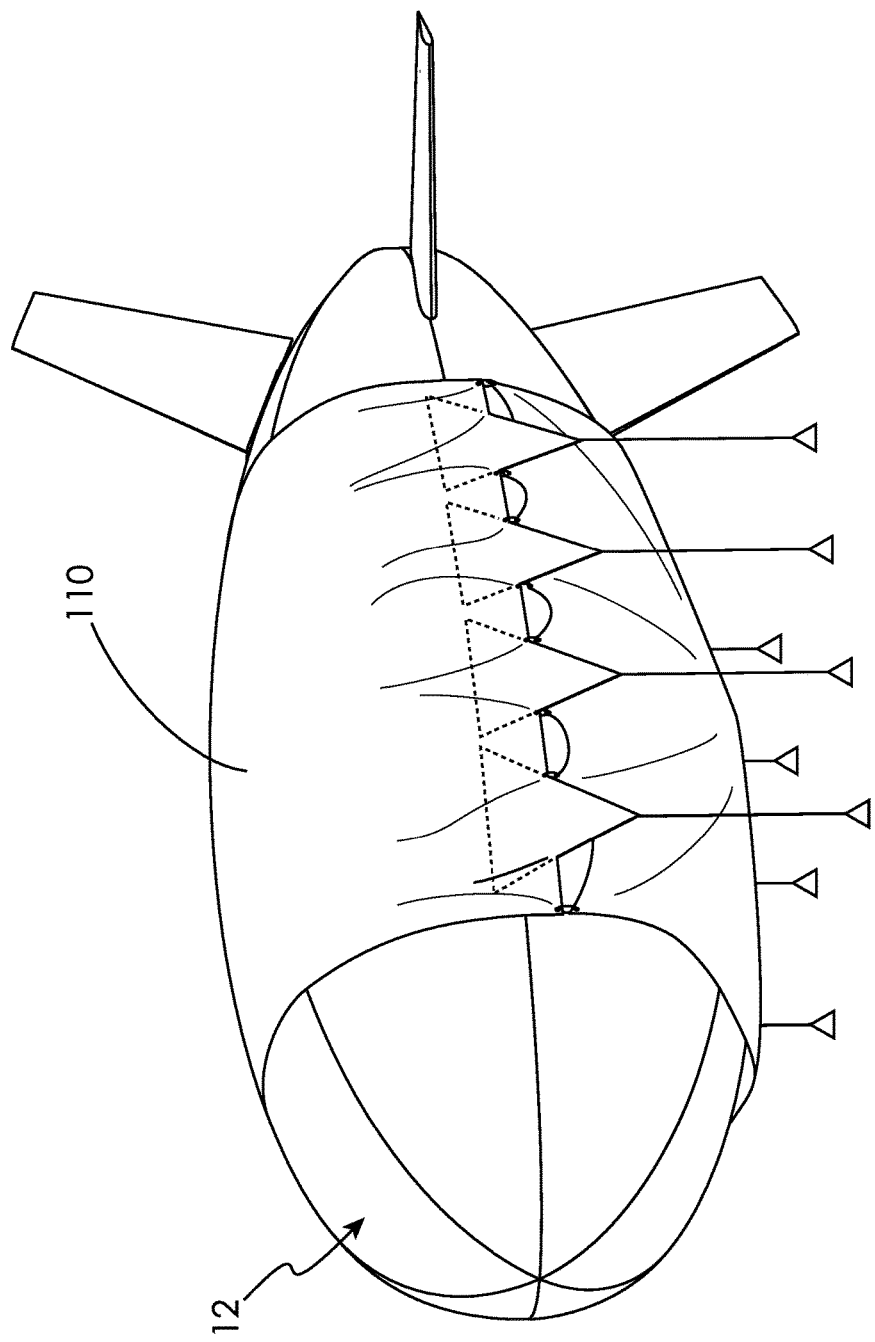
FIG. 10 is a side perspective view of an autonomous vehicle formed in accordance with an embodiment covered by a cocoon formed in accordance with an embodiment.

The trailer body 20 may include a cocoon 110 that extends from the sides of trailer body 20 to wrap around the autonomous vehicle 12 to protect the autonomous vehicle 12 from wind and sand storms while moored, as shown in FIG. 10. The cocoon 110 may include tarps or, alternatively, may include a rigid structure that folds out from trailer body 20. Additionally, a shield/wind screen may extend along a front of autonomous vehicle 12. The cocoon 110 may also include a tarp or rigid roof that entirely encapsulates the autonomous vehicle 12 in a "hanger." The cocoon 110 may engulf the entire autonomous vehicle 12, such that the autonomous vehicle 12 remains protected even if the cocoon 110 and autonomous vehicle 12 become unmoored and blown about in a wind storm. The cocoon 110 may protect the autonomous vehicle 12 in wind storms of up to or more than 50 mile per hour to 60 miles per hours. The cocoon 110 may also protect the autonomous vehicle 12 from small pebbles and rocks that may be blown about in a wind storm.

Winch

A winch 42 is joined to the trailer body 20, such as at one end thereof. The winch 42 is joined to a tether 14, which is joined to the autonomous vehicle 12 at the opposite end. The tether 14 has a length that enables the autonomous vehicle 12 to be deployed to a height of approximately 3,000 feet in one embodiment. The tether 14 extends from the winch 42 and is extended through a fairlead 40. The fairlead 40 may be transported on the trailer body 20 and positioned a distance from the winch 42 during set up. Alternatively, the fairlead 40 may be positioned on an extendable or removable portion of the trailer body 20. The fairlead 40 may be staked to the ground and/or secured with weights, for example sand bags. In an embodiment where the trailer 10 includes a cradle 100, the moveable fairlead 42 may not be included in the system, but rather, the autonomous vehicle 12 may launch directly from the cradle 100 using a fairlead that is fixed to the cradle 100.

Control System

The winch 40 may be electronically controlled by an control system 24 on the trailer 10 that is in communication with the command and control interface 16 via a communication system that may communicate via wireless radio frequency signals. The control system 24 may include a plurality of sensors 134 and ground radars 136, as shown in FIG. 2A, to acquire environmental data, for example, mean power consumption of the autonomous vehicle 12 for 30 seconds, one minute, 10 minutes, or an entire mission, remaining autonomous vehicle 12 battery charge, wind speed, wind direction, and/or ambient temperature, to name just a few non-limiting examples. The sensors 136 may be positioned on the trailer 10 and/or the autonomous vehicle 12.

The sensors 136 monitor the environmental data to determine whether the conditions are safe for deployment of the autonomous vehicle 12. During dangerous conditions, a signal may be sent to the command and control interface 16 instructing the operator to remotely undeploy the autonomous vehicle 12. The signal may be audible or visual. The operator may override this signal if the operator considers the conditions safe. Alternatively, if the signal is not overridden, the winch 42 is automatically instructed to remove the autonomous vehicle 12 from the deployed position. Accordingly, the autonomous vehicle 12 may be removed from the deployed position without the need for an operator at the launch site. In one embodiment, the automatic pull down feature may be turned off to protect a soldier in the field. For example, when a soldier is in the field, the need to protect to soldier trumps the need to protect the autonomous vehicle 12 with an automatic pull down feature.

The sensors 136 may also include weather station sensors, for example sensors for wind speed, wind direction, atmospheric pressure, differential pressure, and atmospheric temperature, to name just a few non-limiting examples. The sensors 136 may also provide real-time predictive weather data.

In one embodiment, a pressure of the autonomous vehicle 12 is monitored by sensors to determine whether the autonomous vehicle 12 is maintaining suitable pressure for flight. If the autonomous vehicle 12 is low on pressure, the trailer 10 may begin pulling the autonomous vehicle 12 down. In one embodiment, the autonomous vehicle 12 is only pulled down to a height that is suitable for the pressure of the vehicle 12. The pressure sensors 136 may also monitor how quickly the autonomous vehicle 12 is losing pressure, so that the autonomous vehicle 12 may continue operation even if the autonomous vehicle 12 has been compromised and has holes therein.

The trailer 10 may also include integrated ground radar and various other sensors, for example unattended ground sensors, such as automated machines guns, gunshot detection sensors, cameras to follow movement near the trailer, and ICOM chatter listening devices, to name just a few non-limiting examples.

Power Distribution System

Figure 11:
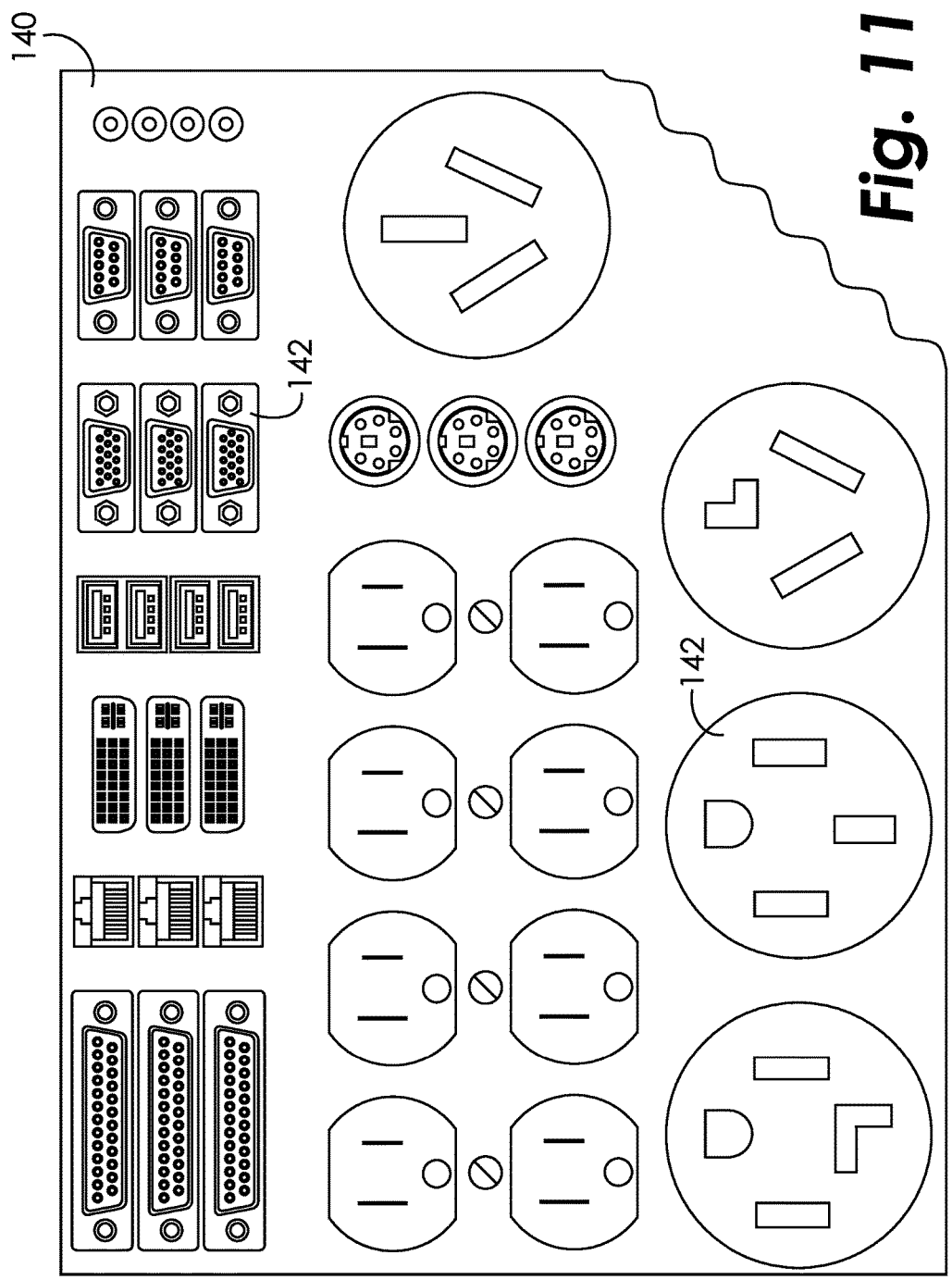
FIG. 11 is a front view of a power distribution system formed in accordance with an embodiment.

The trailer 10 additionally may include a power distribution system 140, as shown in FIG. 11, to supply power to the system 130, while being off the power grid. The power distribution system 140 may accept any raw energy, for example, solar or wind energy. In an exemplary embodiment, FIG. 2B illustrates the trailer 10 with a plurality of solar panels 144. The power distribution system 140 converts the raw energy into clean energy that may be used to power the control system 130. Depending on the number of energy sources, the power distribution system 140 may supply a varying amount of wattage, for example, 3000 Watts, 6000 Watts, 9000 Watts, or the like, to name some non-limiting examples. Moreover, the power distribution system 140 may include outlets 142 to provide power to auxiliary devices, for example, robotics. The power distribution system 140 may have an input of 120 volts to 240 volts, and output power at approximately 240 volts. The power distribution system 140 may generate alternating current or direct current. The power distribution system 140 may include a battery pack so the trailer 10 can operate completely off the grid. A generator 146, as shown in FIG. 2B, may be provided and is only activated as needed. In one embodiment, the power system 140 may be operated with a combustible fluid, such as JP8 fuel or diesel.

Gas Containment

A gas containment system 150, as shown in FIGS. 1A and 1B, may be provided on the trailer 10 to store gas for the autonomous vehicle 12. For example, the gas containment system 150 may store helium and/or hydrogen to be used with the autonomous vehicle 12. In one embodiment, the gas containment system 150 stores water, which is converted into hydrogen by the gas containment system 150. Sensors within the autonomous vehicle 12 may monitor the amount of gas within the vehicle 12, as well as, pressure and temperature. When the autonomous vehicle 12 determines that the gas within the vehicle 12 is too low for deployment, the autonomous vehicle 12 sends a signal to the control system 130 and the winch 40 is activated to remove the autonomous vehicle 12 from the deployed position. Once the autonomous vehicle 12 is positioned back on the ground, the vehicle 12 may be refilled with gas from the gas containment system 150. After refilling, the autonomous vehicle 12 may be redeployed.

Hydrogen may be captured and pressurized for storage on the trailer 10. Alternatively, hydrogen may be captured and pressurized at the trailer 10. In another embodiment, the hydrogen may be captured and stored unpressurized on trailer 10. Moreover, high pressure composite tanks may be stored on the trailer 10 and refilled from a remote location as needed.

Autonomous Vehicle

The autonomous vehicle 12 may be stored and transported while inflated or deflated. In one embodiment, the autonomous vehicle 12 may be fully operational and ready to launch while the trailer 10 is moving. The autonomous vehicle 12 may also be inflated while driving to allow for a quick launch upon parking the trailer 10. The autonomous vehicle 12 may include a hydrogen bladder surrounded by a helium bladder to enable the helium bladder to extinguish any combustion of hydrogen bladder. In one embodiment, the autonomous vehicle 12 may be used to launch guided mortars or other weapons, or as a platform to launch unmanned aerial vehicles.

The autonomous vehicle 12 includes inflatable fins 164 that are inflated separately from the remainder of the autonomous vehicle 12. As such, if a fin 164 is compromised during flight, i.e. receives a bullet hole, the remainder of the vehicle 12 is not compromised. The fins 164 can be quickly removed from the vehicle 12 and replaced. The autonomous vehicle 12 may be brought down to replace the compromised fin 164. Alternatively, the fins 164 may be interchanged, i.e. moved to alternative positions on the vehicle 12 to accommodate a fin 164 that has been deflated.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A trailer for an autonomous vehicle controlled by a command and control interface, the trailer comprising:
    a trailer body configured to retain the autonomous vehicle in an undeployed configuration, the trailer anchoring the autonomous vehicle in a deployed configuration;
    a tether having a first end coupled to the trailer body and a second end configured to couple to the autonomous vehicle;
    a winch for adjusting a length of the tether to move the autonomous vehicle between the undeployed configuration and deployed configuration;
    a cradle coupled to the trailer body, the cradle configured to moor the autonomous vehicle in the undeployed configuration;
    a communication system to communicate with the command and control interface and the autonomous vehicle to control an operation of the winch to move of the autonomous vehicle between the undeployed configuration and deployed configuration; and
    sensors positioned on the trailer body, wherein at least one of the sensors monitor environmental data, wherein the environmental data includes at least one of mean power consumption of the autonomous vehicle for 30 seconds, one minute, 10 minutes, or an entire mission, remaining autonomous vehicle battery charge, wind speed, wind direction, or ambient temperature, and wherein the winch is controlled based on the environmental data.

2. The trailer of claim 1, wherein the communication system transmits a signal to the command and control interface indicating that the autonomous vehicle is required to be removed from the deployed position based on the environmental data.

3. The trailer of claim 1 further comprising a power distribution system to convert raw energy into clean energy, the trailer powered by the power distribution system.

4. The trailer of claim 3 further comprising power outlets electrically coupled to the power distribution system and configured to receive auxiliary devices.

5. The trailer of claim 1 further comprising a gas system to provide gas to the autonomous vehicle.

6. The trailer of claim 1 further comprising a fairlead to guide the tether, the fairlead removable from and positioned remotely from the trailer body to deploy the autonomous vehicle.

7. The trailer of claim 1 further comprising a mast extending upward from the trailer body, the mast configured to receive a payload from the autonomous vehicle.

8. The trailer of claim 1, wherein the communication system communicates with the command and control interface and the autonomous vehicle over wireless radio frequencies.

9. The trailer of claim 1 further comprising integrated ground radar and sensors, wherein the sensors include at least one of automated machines gun sensors, gunshot detection sensors, camera sensors, and ICOM chatter listening devices.

10. The trailer of claim 1 further comprising weather station sensors to monitor at least one of wind speed, wind direction, atmospheric pressure, and atmospheric temperature.

11. The trailer of claim 1, wherein the trailer body is expandable to extend a footprint of the trailer.

12. The trailer of claim 1, wherein the cradle moors the autonomous vehicle in one of a deflated configuration or an inflated configuration.

13. The trailer of claim 1, wherein the cradle rotates with respect to the trailer body.

14. The trailer of claim 13, wherein the cradle rotates 360 degrees about the axis extending substantially vertical of the trailer.

15. The trailer of claim 1, further comprising a cocoon that extends from the trailer body around the autonomous vehicle.

16. The trailer of claim 15, wherein the cocoon includes at least one of a rigid structure that folds out from trailer body, a wind screen that extends along a front of the autonomous vehicle, and a roof to entirely encapsulate the autonomous vehicle.

17. A trailer for an autonomous vehicle controlled by a command and control interface, the trailer comprising:
    a trailer body configured to retain the autonomous vehicle in an undeployed configuration, the trailer anchoring the autonomous vehicle in a deployed configuration;
    a tether having a first end coupled to the trailer body and a second end configured to couple to the autonomous vehicle;
    a winch for adjusting a length of the tether to move the autonomous vehicle between the undeployed configuration and deployed configuration;
    a cradle coupled to the trailer body, the cradle configured to moor the autonomous vehicle in the undeployed configuration;
    a cradle extension that extends outward from the cradle;
    a wheel support that extends between the cradle extension and the ground, the wheel support having a wheel on an end thereof that is positioned on the ground; and
    a communication system to communicate with the command and control interface and the autonomous vehicle to control an operation of the winch to move of the autonomous vehicle between the undeployed configuration and deployed configuration.

18. A method for commanding and controlling an autonomous vehicle using a command and control interface communicatively coupled to the autonomous vehicle, the method comprising:
    mooring, by a cradle of a trailer, the autonomous vehicle in an undeployed configuration;
    monitoring, by one or more sensors of the trailer, environmental data, wherein the environmental data includes at least one of mean power consumption of the autonomous vehicle for 30 seconds, one minute, 10 minutes, or an entire mission, remaining autonomous vehicle battery charge, wind speed, wind direction, or ambient temperature; and adjusting, by a winch, a length of a tether anchoring the autonomous vehicle to the cradle to transition the autonomous vehicle directly from the cradle into a deployed configuration at least in part based on the environmental data monitored by the one or more sensors of the trailer.

19. The method of claim 18, further comprising:

monitoring, by one or more sensors of the autonomous vehicle, one or more conditions for flight; and adjusting, by the winch, the length of the tether based least in part on the one or more conditions for flight monitored by the one or more sensors of the autonomous vehicle.

20. A method for commanding and controlling an autonomous vehicle using a command and control interface communicatively coupled to the autonomous vehicle, the method comprising:

mooring, by a cradle of a trailer, the autonomous vehicle in an undeployed configuration;

monitoring, by one or more sensors of the autonomous vehicle, one or more conditions for flight; and rotating, by the command and control interface and without intervention by a human, the cradle about an axis of a trailer body of the trailer based on the one or more conditions for flight, wherein the axis extends substantially vertical to the trailer, and wherein rotating the cradle comprises rotating the cradle between 0 and 360 degrees about the axis.

21. A method for commanding and controlling an autonomous vehicle using a command and control interface communicatively coupled to the autonomous vehicle, the method comprising:

mooring, by a cradle of a trailer, the autonomous vehicle in an undeployed configuration;

monitoring, by one or more sensors of the autonomous vehicle, one or more conditions for flight;

detecting, by the autonomous vehicle, whether a component of the autonomous vehicle has been compromised; and automatically adjusting, by a winch and without intervention by the human, the length of a tether to transition the autonomous vehicle from the deployed configuration into the undeployed configuration in the cradle in response to the detection of compromise to the component of the autonomous vehicle.

22. The method of claim 21, wherein detecting the compromise of the component of the autonomous vehicle comprises detecting damage to an inflatable fin of the autonomous vehicle.

* * * * *